United States Patent [19]
Hilmersson

[11] Patent Number: 6,021,950
[45] Date of Patent: *Feb. 8, 2000

[54] DEVICE HAVING DUAL SENSORS FOR CHECKING PATTERNS DISPOSED ON A MATERIAL STRIP METHOD FOR CHECKING PATTERNS, AND THE MATERIAL STRIP

[75] Inventor: Anders Hilmersson, Lund, Sweden

[73] Assignee: Tetra Laval Holdings & Finance, Pully, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 08/796,687

[22] Filed: Feb. 10, 1997

[30] Foreign Application Priority Data

Feb. 9, 1996 [WO] WIPO ..................... PCT/EP96/00546

[51] Int. Cl.[7] .................................................. G06K 19/06
[52] U.S. Cl. ............... 235/494; 235/462.16; 235/462.25
[58] Field of Search ..................................... 235/494, 454, 235/456, 462, 463, 466, 487, 462.01, 462.16

[56] References Cited

U.S. PATENT DOCUMENTS

| | | | |
|---|---|---|---|
| 3,562,494 | 2/1971 | Schmidt | 235/466 |
| 3,796,862 | 3/1974 | Asija | 235/462 |
| 3,896,917 | 7/1975 | Taplin | 235/494 |
| 3,922,539 | 11/1975 | Carnes et al. | 250/559.44 |
| 4,013,893 | 3/1977 | Hertig | 250/568 |
| 4,499,372 | 2/1985 | Nakano | 250/223 |
| 4,515,481 | 5/1985 | Yamada et al. | 250/557 |
| 4,600,841 | 7/1986 | Tokuno et al. | 250/548 |
| 4,614,430 | 9/1986 | Hara et al. | 382/149 |
| 4,698,514 | 10/1987 | Hilmersson et al. | 235/456 |
| 4,704,533 | 11/1987 | Rose et al. | 250/342 |

*Primary Examiner*—Michael G Lee
*Assistant Examiner*—Diane I. Lee
*Attorney, Agent, or Firm*—Hopgood, Calimade, Kalil & Judlowe, LLP

[57] ABSTRACT

Method and device for checking patterns (1) disposed on a material strip (30) which patterns (1) consist of groups of dark and light areas (**2,2\*,3,3\*) succeeding in the travelling direction (v) of the material strip (30) and the checking respectively, by displacing the position of the dark areas (2,3) and/or the light areas (2\*,3\*) of one group with respect to a related detector (8,9) in regard to the dark areas (2,3) and/or light areas (2\*,3\*) of another group with respect to another related detector (8,9) by detecting the existence or non-existence of dark areas and/or light areas and by creating a sequence of output signals dependent on the result of the detection by combining the output signals comprising information concerning the dark or light areas (2,2\*,3,3\*) of each detector (8,9) with the output signals depending on the detection of one of the dark or light areas (2,2\*,3,3\*) of the other detector (8,9) in a predetermined way by for example alternately activating each detector (8,9) by the other detector (8,9**) and by comparing this sequence of output signals with a predetermined sequence of signals.

23 Claims, 5 Drawing Sheets

DEVICE HAVING DUAL SENSORS FOR CHECKING PATTERNS DISPOSED ON A MATERIAL STRIP METHOD FOR CHECKING PATTERNS, AND THE MATERIAL STRIP

BACKGROUND OF THE INVENTION

The present invention relates to a method and a device for checking patterns disposed on a material strip by photoelectric or other means, comprising control means and arrangements defined in the preambles of claims 1 and 9, and a material strip.

It is already known in the art to control processing operations on a travelling material strip by means of control marks printed on the strip which can be detected by photocells or other optical devices. These patterns which are disposed on the material strip are usually printed in a color tone which contrasts with the surroundings, thus enabling the detection means to detect the exact position of the patterns and therefore defining the current position of the material strip. These patterns can also be made with magnetically sensible material or with the help of patterns sensible by mechanical means, for example holes, crease lines, slots etc.

By the detection of the exact position of the material strip it is possible to apply multicolour printing on the material strip and to adapt the position of the pictures. These pictures contain several colours which are printed on the material strip by the usage of several processing machines, each of them printing a certain colour on top of the picture in process which has been prepared by preceeding processing machines which have printed other colours on the material strip. Therefore, a multicolour picture can be created and printed on the material strip wherein the different colours overlay each other at the exact position.

Another use of the checking device or checking method, respectively, is to detect the exact position of the material strip in order to apply a certain printing pattern on top of the previously preprinted material strip at a certain point or in order to arrange a printed pattern and a crease line pattern which facilitates the folding in register with each other.

Further fields of application exist, for example, where a packaging material strip is to be advanced in a packaging machine or the like over exactly the length of pattern so as to obtain, an the one hand, the printed pattern in the same position on all packages, and to ensure, on the other hand, that the said crease line pattern coincides with the forming device of the packaging machine so that the folding of the material takes place along the crease lines which are predetermined in their position. In order to manufacture the material strip, like stamping holes, applying opening apertures or additional crease lines, it is necessary to know the exact position of the material strip as well.

Up to know, it is well now to provide such material strips with patterns which can be detected by sensors, thus determining the exact position of the strip. It is known from EP-A-0 131 241 to use a pattern like a bar code with two groups of dark and light areas which succeed in the direction of the detection wherein the position of the dark areas and/or the light areas of one group with respect to a related detector is displaced in regard to the dark areas and/or the light areas of another group with respect to another related detector. These detectors detect the existence or, respectively, the non-existence of dark areas and/or light areas and produce output signals which depend on the result of the detection. This is carried out by using one detector which activates upon the detection of dark and/or light areas the other detector which detects the existence or the non-existence of dark and/or light areas wherein the output signals of the second detector are compared with a predetermined sequence of signals. If the sequence of output signals is equal to the predetermined sequence of signals the comparator will output an activation signal which activates the above described processing machines which require the exact position of the material strip.

These patterns usually disturb the general appearance of a décor of the material strip and it is desirable therefore, to accommodate the control patterns within the existing décor or on a very small blank surfaces which, in principle, only comprise the control patterns. However, this has given rise to great problems since the elements adapted to sense the patterns conceive and register all parts of the décor as well as the control patterns with the consequence that many output signals are supplied by the second detector depending on the dark and/or light areas of the décor and the control pattern. Since these output signals have to be compared within a real-time procedure it is quiet likely to detect false signals by an undesired identity of a sequence of dark and/or light areas of the décor and the predetermined sequence of signals. Consequently, the wrong position of the material strip is detected and the following processing machines destroy the décor or the material strip by getting the wrong information.

It has been another great problem that the control pattern should be as small as possible, in order to avoid the optical disturbance of the décor, but should avoid the detection of false signals.

Additionally, there is a need of the packaging industry to be independent from any control patterns and to detect the décor of the material strip by, for example, the décor itself.

SUMMARY OF THE INVENTION

Is an object of the present invention to provide a device and a method for exactly and safely checking patterns disposed on a material strip in order to e.g. precisely detect the exact position of the material strip.

It is another object of the invention not to enlarge the size of the control but to increase the reliability of the checking device.

It is moreover another object of the invention to provide a method and a device for detecting the exact position of the material strip without any additional control patterns which could disturb the décor of the material strip.

Additionally, it is an object of the invention to be independent from the position of the control pattern and to increase the reliability of the method and of the device by using synergistically the outputs of the detectors.

The invention is characterized in claims 1, 9, 15 and 23.

The invention is realized by using the output signals of at least two detectors, by combining the output signals to form a sequence of output signals in a predetermined way wherein each detector may enable the other detector to write output signals into a comparator upon detection of an edge of a dark or light area, and by comparing said sequence with a predetermined sequence, wherein the output signals comprise information concerning the dark and/or light areas.

This can be done by using the output signals of both detectors by combining them within the comparator. Upon detection of a dark area of one of the detectors a signal (e.g. a "1") is written into the comparator, upon the detection of a light area, another signal (e.g. a "0") is written into the comparator. Upon equivalence of the achieved sequence of output signals with a predetermined sequence of signals one or more actuators are activated.

This can also be done by using the output signals of one detector as a clock input for the comparator which enables a data input of the comparator to write output signals of the other detector into the comparator wherein the clock input is activated upon detection of an edge of one of the dark and/or light areas and vice versa. In order to ameliorate the reliability of the system the clock input can additionally be used as an output signal for the sequence of output signals which is compared with a predetermined sequence of signals and which depends on the transition of light to dark and dark to light areas. Consequently, the comparator receives a lot of output signals of more than one detector and therefore much better prevents the detection of false signals, pretending to have detected the control pattern, by detecting a sequence of dark and light areas within the décor on the material strip which is identical to the sequence of the control pattern. The comparator afterwards outputs an output signal upon equivalence of the sequence of output signals with the predetermined sequence of signals wherein the output signal activates one or more actuators of different strip treating machines. The above named clock input can be provided as well by a detector which is dependent on the travelling material strip. This could be a succession of equally large white and dark areas, the rotation of a wheel which supports the travelling of the material strip or equivalent means.

The comparator can comprise a shift register which registers the exact lengths of information given by the detectors upon detection of the control pattern, thus enabling the output signal of the comparator upon identity of the output signals with the predetermined sequence of signals.

The present methods allow the treating of much more signals, preferably binary signals, in order to better distinguish the correct pattern from a false one without enlarging the area the pattern needs on the material strip.

The method for checking patterns can be carried out by using the prescribed device or by similar devices which function accordingly wherein the patterns which should be detected by the checking device and which are disposed on the material strip can have mechanical, electrical, magnetical and/or optical properties which are detected by mechanical, electrical, mechanical and/or optical sensors and detectors, respectively.

The dark and/or light areas of the material strip can be parts of pictures, designs or array configurations and need not be explicitly separate control patterns which are placed deliberately on the material strip. Nevertheless, it is favourable to use a bar code of light and dark areas since the detection of these areas is most reliable. The respective dark and light areas of one group of pattern can be displaced with regard to the other group of dark and light areas with respect to the corresponding detectors. Both groups of patterns could be on the same height of the material strip if the detectors are displaced with respect to each other or for example at the top and bottom of the completed package if the detectors are displaced with respect to the patterns and themselves.

Sometimes it is helpful to enable the comparator to distinguish the pulses derived from the first detector from the output pulses (of the other group of areas) derived from the second detector. In order to solve this problem, the pulse of the first detector could be higher and/or longer or could be followed by a short secondary pulse each and/or by positive and negative (reverse) pulses, resp.

DESCRIPTION OF THE DRAWINGS

Especially advantageous embodiments of the present invention will be described in the following with reference to the enclosed drawings, wherein.

DESCRIPTION OF THE PREFERRED EMBODIMENTS

Figure 1:
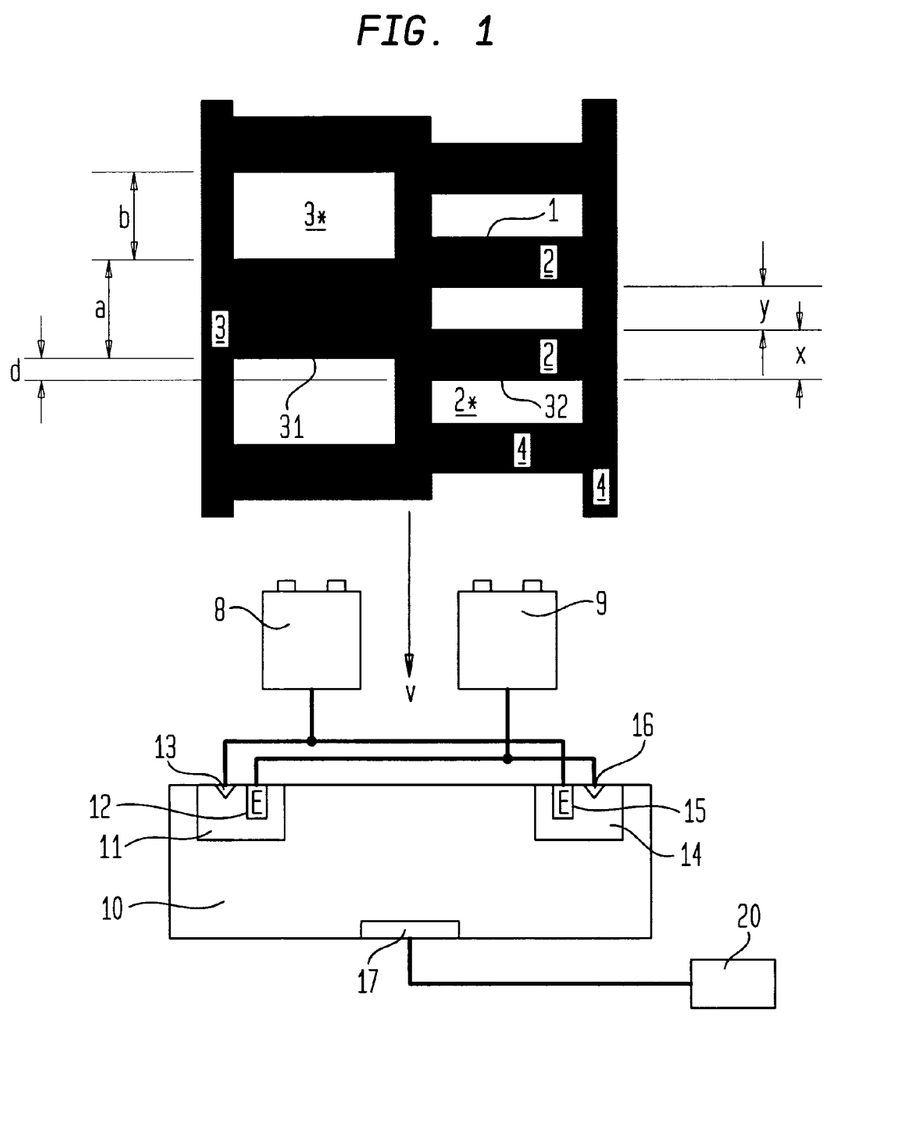
FIG. 1 shows a schematic structure of a checking device together with a control pattern

The upper part of FIG. 1 shows a pattern 1 with dark areas 2 on the right side (first group) and dark areas 3 on the left side (second group) separated by light areas 2* on the right side and light areas 3* on the left side. The dark areas 2, 3 are connected by connection areas 4 wherein the dark areas 2, are arranged horizontally and the connection areas 4 are arranged vertically crossing at an angle of 90° on the material strip. The dark areas 2 on the right side have the width x and the light areas 2* on the right side have the width y. The dark and light areas 3 and 3* on the left side have the width a and b, respectivelly. The distance between the edge 32 of a dark area 2 on the right side and the edge 31 of a dark area 3 on the left side is d. This arrangement constitutes a bar code used as a control pattern in order to detect the exact position of the material strip travelling in the direction v.

The control pattern is detected by two detectors 8 and 9 producing binary output signals upon the detection of dark and/or light areas 2, 2*, 3, 3* or the edges 31, 32 of dark and/or light areas wherein these output signals are proceeded to a comparator 10 comparing the sequence of output signals with a predetermined sequence of signals. The data inputs 13 and 16 are enabled throughout the clock inputs 12 and 15, respectively, thus enabling the detector 8 or 9, respectively, to write their output signals into the comparator 10, thus creating the sequence of output signals.

Upon the detection of a dark area 3 by the detector 8, the detector 8 is enabling the data input 16 throughout the clock input 15 wherein the detector 9 detects at the same time a white area 2* and gives the respective information to the comparator 10 throughout the data input 16. Upon the detection of an edge of a black area 2, the detector 9 enables the data input 13 throughout the clock input 12 to receive information from the detector 8 detecting a dark area 3. This procedure is done vice versa until all dark 2,3, and/or light areas 2*,3* are detected and the respective information is inputted into the comparator 10. If the sequence of output signals from the detectors 8 and 9 is identical to a predetermined sequence of signals the output 17 is activated and signal is given to one or more actuators 20 which process the material strip, a tube formed by said material strip or the package afterwards.

It can be understood that either the output signals of the detector 8 or the output signals of the detector 9 or both output signals are used to create the sequence of output signals within the comparator 10.

Figure 2:
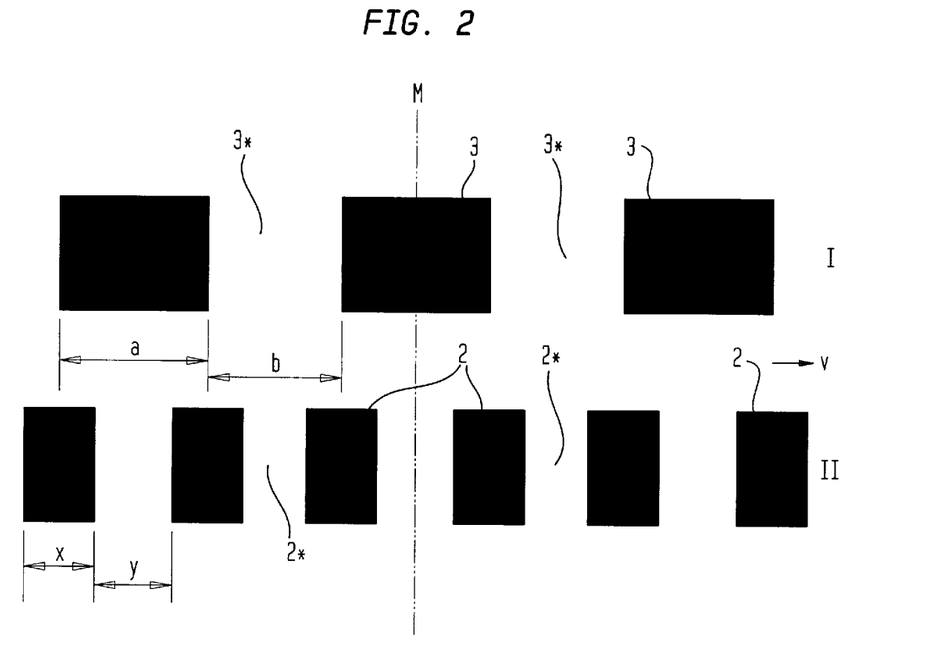
FIG. 2 shows preferred sizes of control pattern

FIG. 2 shows a preferred pattern of two groups of dark areas (2,3) e.g. black areas and light areas (2*,3*) e.g. white areas which is symmetrical with regard to the center line M being situated perpendicularly with regard to the direction v of movement (parallel to the v-axis) of the web. The middle dark area 3 of the first group I and the middle light area 2* of the second group II are crossed by the center line M which does not appear on the web. According to FIG. 2 the middle dark area 3 and its neighbour light area 3* have double the width of said middle light area 2* and its neighbour dark areas 2 and the next succeeding light areas 2* and dark areas 2 at both sides of said center line M of FIG. 2. Here, the widths (a, b) of the first group of dark/light areas (3,3*) is twice as big as the widths (x, y) of the second group of dark/light areas (2,2*).

Figure 3:
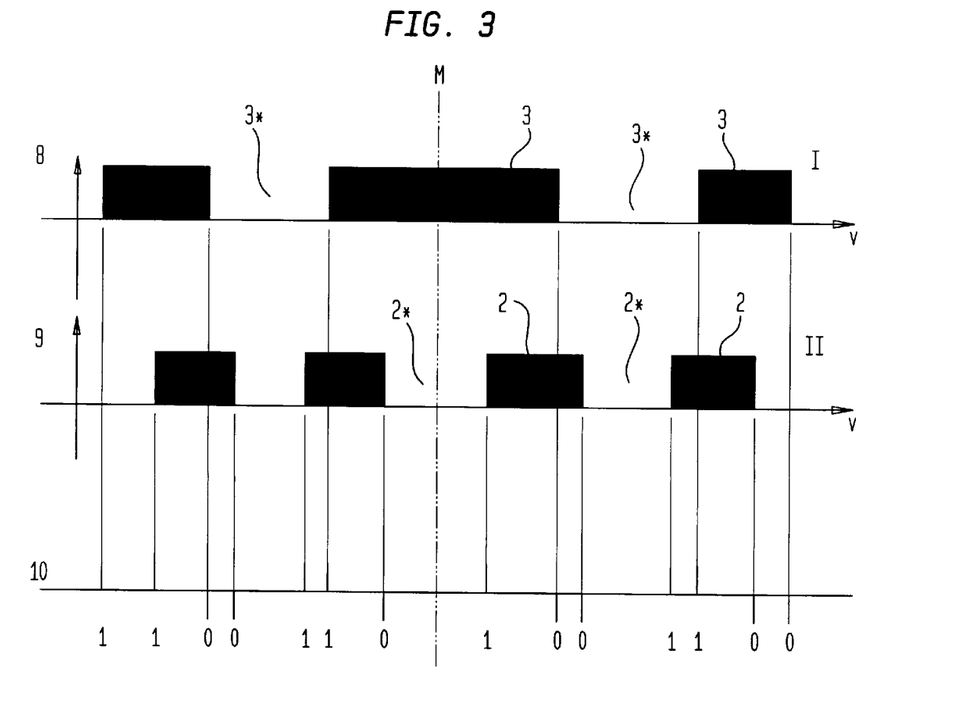
FIG. 3 shows the output signals of the detectors and the resulting sequence of signals within the comparator

The creation of a sequence of output signals is shown within FIG. 3 where the detector 8 and the detector 9 give binary signals upon the detection of dark and light areas. If the detector 8 detects a transition from light to dark it writes a "1" signal into the comparator 10 while the detector 9 writes a "1" into the comparator 10 upon detection of a transission from light to dark as well. If the detector 8 detects a transission from dark to light it writes "0" into the comparator 10 as well as the detector 9 does. By doing so the output signals of both detectors are combined in a predetermined way namely the predetermined succession of "1" and "0" which is given by the shape and design of the bar code wherein the example of FIG. 3 shows the succession "11001101001100". Here, a sequence of 14 bits is achieved within a very small and tiny bar code since both detectors write their output signals into the comparator 10. It is easy to understand that even more detectors and more patterns can be used to increase the number of bits within the predetermined sequence of output signals and thus ameliorating the reliability of the checking device.

Figure 4:
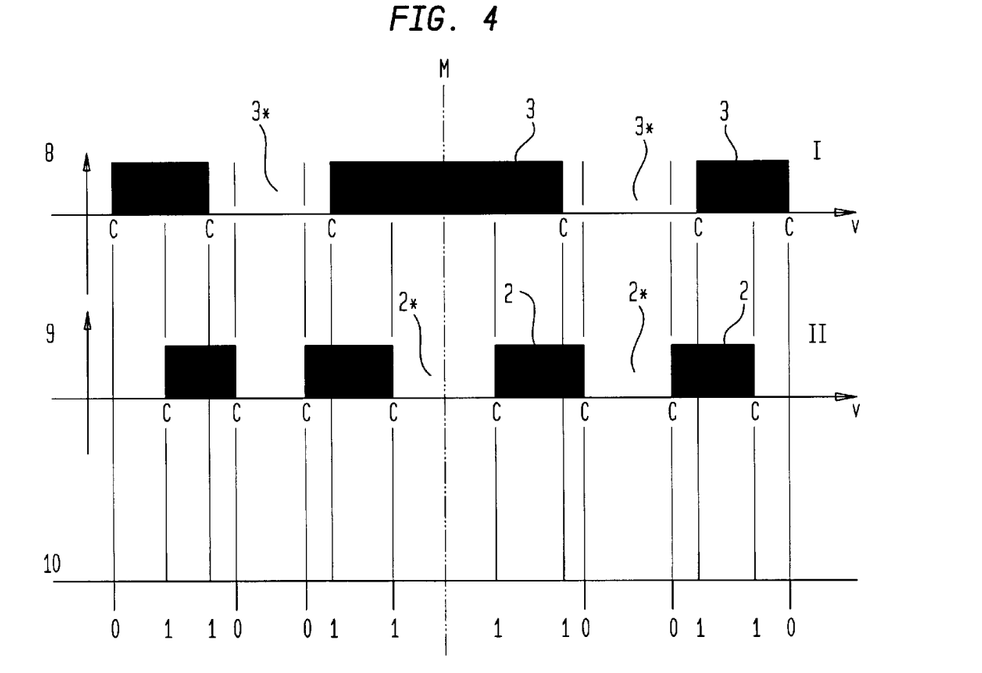
FIG. 4 shows another embodiment with respect to FIG. 2

The creation of another sequence of output signals is shown within, FIG. 4 where the detector 8 and the detector 9 give binary signals upon the detection of dark and light areas. If the detector 8 receives a "1" input which is used as a clock signal C the present information of detector 9 (which is a "0" at that time) is given to the comparator 10. If the detector 9 receives a "1" input which is also used as a clock input C the present information of detector 8 (which is a "1" at that time) is given to the comparator 10. After the detection of the whole bar code, used as a control pattern, the comparator received the input "0110 0111 1001 10" that means of 14 bits, thus more than 11 binary output signals.

This sequence of output signals which consist of binary signals is compared with a predetermined sequence of signals in order to activate the actuators 20. Usually, the first "0" is not used since the first transition from a light to a dark area might be too close to the decor. Therefore, the comparator contains a 13 bit information.

As can be seen from the method, the information received from one and the same control pattern is extended to 13 bit, thus ameliorating the reliability of the detection method. Therefore, the existing code can be used in a better way. While the material strip is travelling with a speed of several 100 meters per minute the photocells used as detectors 8 and 9 are able to detect light and dark areas with a frequency of about 10 kHz. Thus, the "speed" of the photocells is sufficiently high to read patterns 1 on a material strip which is proceeding with the above described speed. Consequently, the widths (a,b,x,y) of the dark and light areas can be reduced to a minimum enabling the user of the detection device and the detection method to use very small patterns which do not disturb the optical apperance of the décor placed on the material strip. The usual width a of successive dark areas 3 of one group is about the same as the width b at the successive light areas 3* of the same group which widths a, b are about twice the widths x, y of successive dark and light areas of another group. Preferably, the width x of the successive dark areas is about the same as the width y of the successive light areas, usually in the range of 1 to 3 mm wherein smaller or bigger widths can be detected depending upon the light source, supplying the photocells, or, for example, the magnetic density of magnetic patterns placed on the material strip.

In order to create the sequence of output signals with respect to FIG. 4 it is necessary that the edges of dark and light areas are situated on the strip 30 in such a way with regard to their related detector 8, 9 that when one detector 8, 9 detects an edge, e.g. the edge 32 of the frist group, the other detector 8, 9 does not detect an edge but a black or white area of the other group. Experiments have shown that an increasing number of checking bits within the comparator 10 increases the reliability of the checking method.

Figure 5:
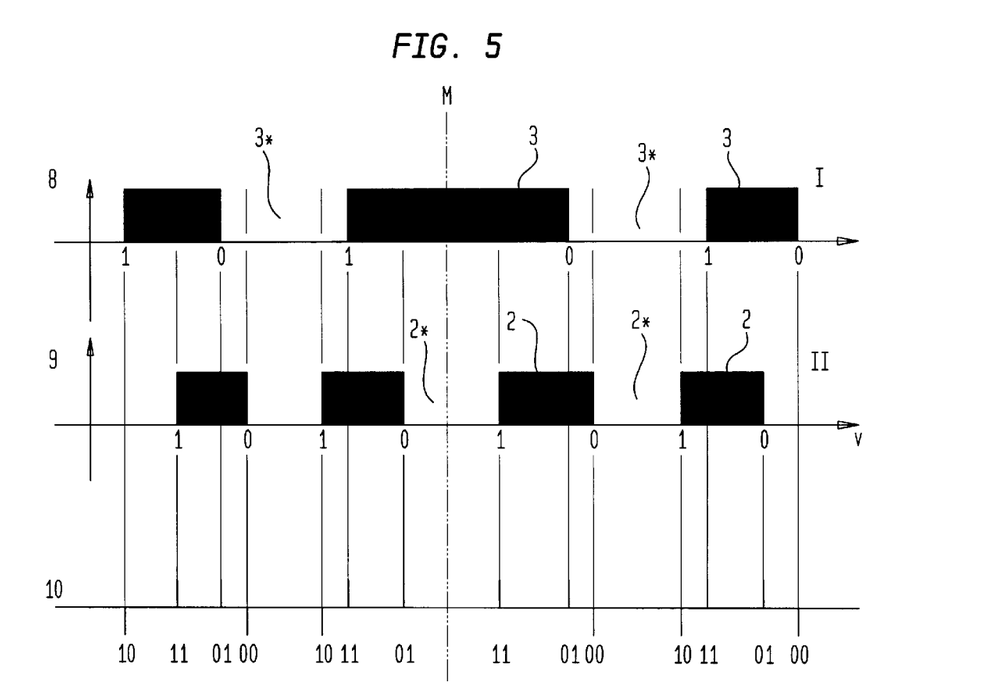
FIG. 5 shows another embodiment with respect to FIG. 2

FIG. 5 shows another embodiment of the checking method wherein both output signals of the detectors 8 and 9 are used, thus receiving the sequence of output signals: 1011 0100 1011 0111 0100 1011 0100.

Here, it can be seen that depending upon the method of using the output signals the reliability of the checking method can be increased rapidly by using the same control pattern. Here, the output signals which are derived from the detection of dark areas 2 and 3 and/or from the detection of positive edges (from light to dark areas) are represented by a "1" and the output signals which are derived from the detection of light areas 2* and 3* and/or from the detection of negative edges (from dark to light areas) are represented by a "0".

Figure 6:
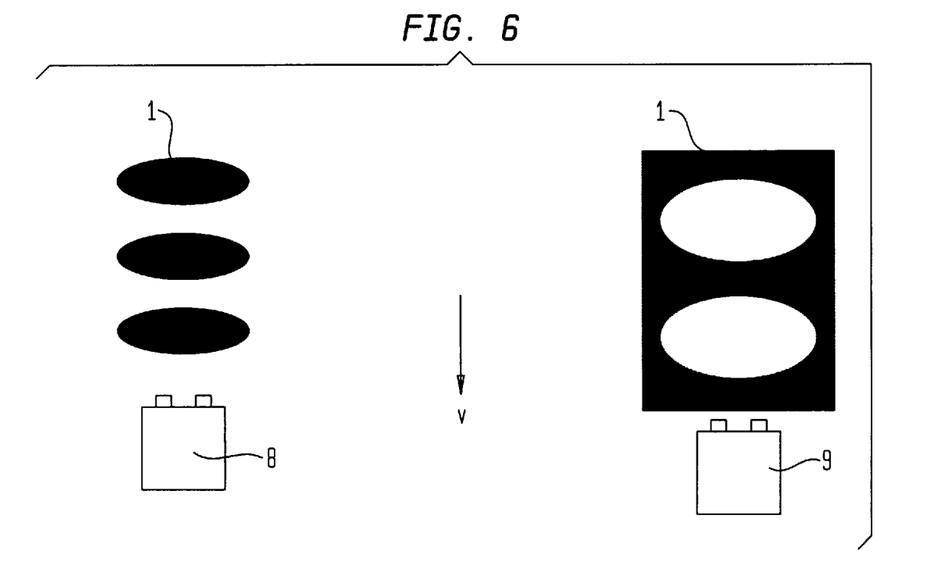
FIG. 6 shows two groups of control patterns displaced with respect to each other

FIG. 6 shows the arrangement of a control pattern which groups of dark and light areas are displaced with respect to their corresponding detectors 8,9 with regard to each other. Therefore, the different groups of pattern can be placed on different positions on the material strip which prevents the user from having a bar code on the material strip disturbing the optical impression of the décor.

Figure 7:
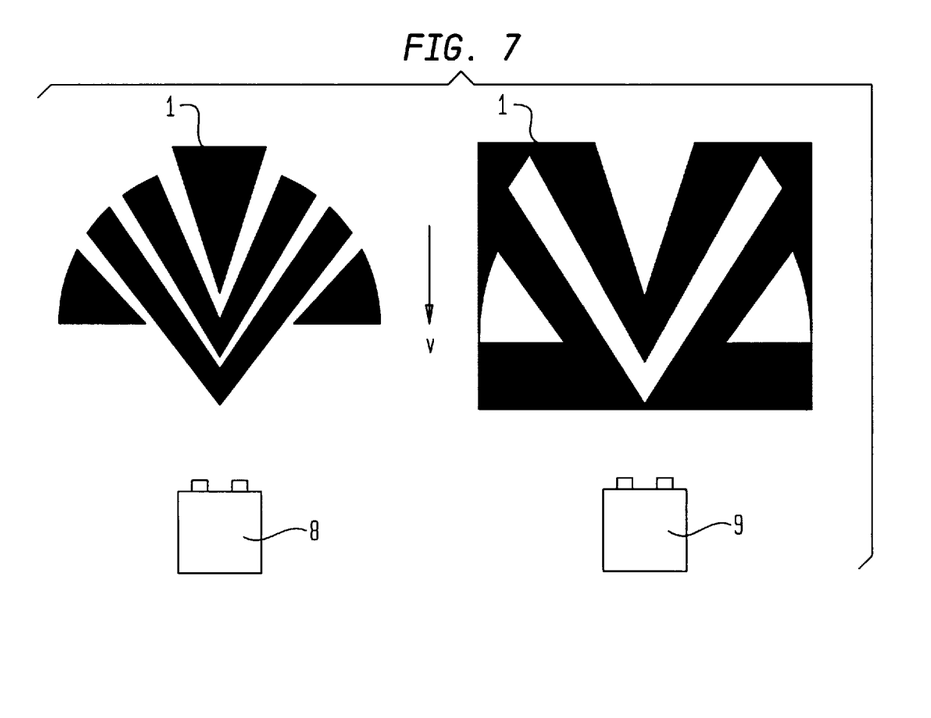
FIG. 7 shows different décors on the material strip used as control patterns and FIG. 8 shows a schematic view of processing machines and one group of control patterns.

Moreover, the décor itself can be used for the checking method which is shown within FIG. 7. Here, a certain décor, preferably consisting of white and dark areas, is used for the presribed checking method wherein the respective groups of white and dark areas are displaced with respect to their corresponding detectors with regard to each other. Thus, the respective dark and/or light areas are parts of pictures, designs or array configurations on the material strip.

Figure 8:
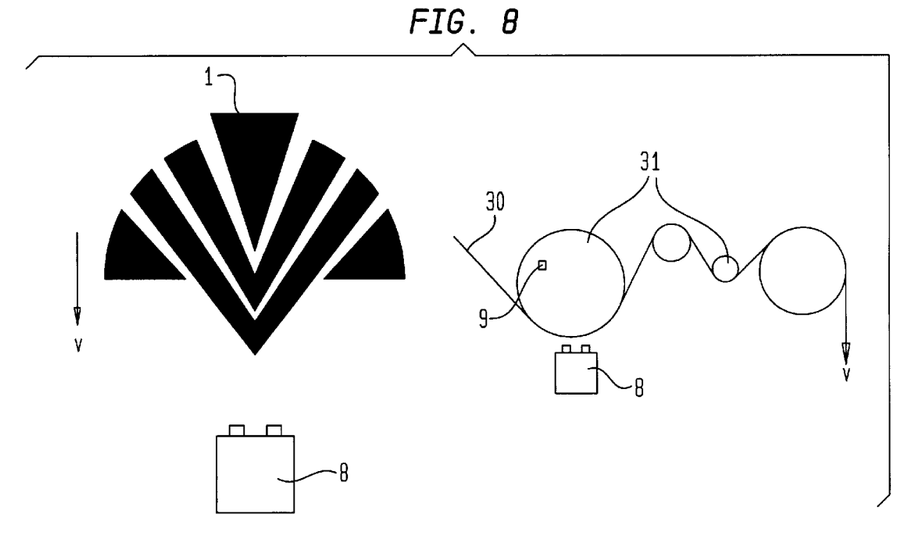

FIG. 8 shows the use of a detector 8 detecting white and dark areas disposed on the material strip which is forwarded by processing wheels 31. The detector 8 is placed underneath a wheel 31 which is turning with a certain speed. The succession speed of the material strip 30 is detected by a detector 9 which measures the turning speed of the wheel 31. By the interaction of both detectors the same results can be achieved as described above. The detector 9 can be placed at different places within the processing line or can be substituted by already existing sensors or detectors which depend on the speed of the material strip in one or another way.

I claim:

1. A device for checking patterns (1) disposed on a material strip (30), which patterns (1) consist of groups of dark and light areas (2, 2*; 3, 3*), said areas succeeding in a direction (v) of checking, wherein a position of the dark areas (2) and light areas (2*) of one group with respect to a related detector (9) is displaced in regard to the dark areas (3) and light areas (3*) of another group with respect to another related detector (8), which detectors (8, 9) detect an existence of dark areas (2, 3) and light areas (2*, 3*) and produce output signals dependent on a result of the detection, wherein a comparator (10) compares a sequence of output signals with a predetermined sequence of signals, wherein:

a) said comparator (10) is directly connected to at least two detectors (8, 9);
 b) dark areas (2, 3) and/or light areas (2*, 3*) representing output signals are supplied from at least two detectors (8, 9) to said comparator (10);
 c) said dark areas (2, 3) and/or light areas (2*, 3*) representing output signals of said at least two detectors (8, 9) are firstly combined within said comparator to form a sequence of output signals, and
 d) said comparator (10) subsequently compares said combined sequence of output signals with a predetermined sequence of signals and creates an output signal of the comparator (10) if both sequences are similar.

2. The device of claim 1, wherein both detectors (8, 9) write edge detecting output signals into said comparator (10) upon detection of an edge between said dark areas (2, 3) and said light areas (2*, 3*) of said material strip (30).

3. The device of claim 1, wherein both detectors (8, 9) write edge detecting output signals into said comparator (10) upon detection of an edge between said dark areas (2, 3) and said light areas (2*, 3*) of said material strip (30), where the output signals from one of the detectors (8, 9) are indirectly supplied to the comparator (10) through the other of said detectors (8, 9) by activation of the latter one.

4. The device of claim 1, wherein said detectors (8, 9) are connected to clock inputs (12, 15) of said comparator (10) which clock inputs allow data inputs (13, 16) of said comparator (10) to receive output signals from the other detector of both detectors (8, 9) upon the detection of an edge between said dark areas (2, 3) and light areas (2*, 3*) of said material strip (30).

5. The device of claim 4, wherein said clock input (12, 15) is additionally used as an output signal for said sequence of output signals depending on the transition light/dark or dark/light of said areas (2, 2*, 3, 3*).

6. The device of claim 1, wherein said comparator (10) outputs an output signal (17) upon equivalence of said sequence of output signals with said predetermined sequence of signals, which output signal (17) activates at least one actuator (20) of a strip treating and/or packaging machine.

7. The device of claim 1, wherein detectors (8, 9) additionally comprise clock inputs for detecting the succession speed of said material strip (30).

8. The device of claim 1, wherein a shift register of said comparator (10) forms said information signal sequence.

9. The device of claim 1, wherein the comparator (10) comprises means for distinguishing the output pulses of one of the detectors (8, 9) from the output pulses of another one of the detectors (8, 9).

10. A method for checking patterns (1) disposed on a material strip (30), which patterns (1) consist of groups of first areas and second areas (2, 3; 2*, 3*), said first areas and second areas differing in mechanical, electrical, magnetic, and/or optical properties, said areas succeeding in a direction (v) of checking, comprising steps of:

(a) displacing a position of the first areas (2) and second areas (2*) of one group with respect to a related detector (9) in regard to the first areas (3) and second areas (3*) of another group with respect to another related detector (8);
 (b) detecting an existence of first areas (2, 3) and second areas (2*, 3*);
 (c) producing output signals dependent on a result of said detecting; and
 (d) comparing a sequence of said output signals with a predetermined sequence of signals with a comparator, wherein a sequence of output signals depending on the detection of first areas (2, 3) and/or second areas (2*, 3*) by at least two detectors (8, 9) is firstly formed within said comparator in a predetermined way in order to enable said sequence to be compared with a predetermined sequence of signals, and that said sequence of output signals of said detectors (8, 9) is compared with said predetermined sequence of signals in order to create an output signal of said comparator (10) if both sequences are similar.

11. The method of claim 10, wherein alternative ones of said at least two detectors (8, 9) are activated by a signal from another detector of said at least two detectors (8, 9) upon detection of an edge of one of said first areas (2, 3) or second areas (2*, 3*).

12. The method of claim 11, wherein the step of producing output signals dependent the output signals of each detector (8, 9) comprises providing information concerning said dark or light areas (2, 2*, 3, 3*) and Alternately activating each detector (8, 9) by the other detector (8, 9) after detecting an edge of one of said dark or light areas (2, 2*, 3, 3*) by the other detector (8, 9).

13. The method of claim 10, wherein said first areas (2, 3) and said second areas (2*, 3*) comprise mechanical, electrical, magnetic, or optical properties, or a combination thereof, and said detectors (8, 9) detect said mechanical, electrical, magnetic, or optical properties or combination thereof.

14. The method of claim 10, wherein said output signals comprise binary signals.

15. The method of claim 14, wherein representing said output signals, derived from the detection of said first areas (2, 3) and/or from the detection of positive edges (from second to first areas), by a "1" each and representing said output signals, derived from detection of said second areas (2*, 3*) and/or from the detection of negative edges (from first to second areas), by a "0" each, or vice versa.

16. An article of manufacture, comprising a material strip (30), used for the device as claimed in claim 1, or used for the method as claimed in claim 10, wherein said first and/or second areas (2, 2*, 3, 3*) are parts of pictures, designs, and/or array configurations on said material strip (30).

17. The material strip (30) of claim 16, wherein said first and/or second areas (2, 2*, 3, 3*) are parts of a bar code.

18. The material strip (30) of claim 16, wherein said first and/or second areas (2, 2*, 3, 3*) of both groups are connected by connection areas (4) on said material strip (30).

19. The material strip (30) of claim 16, wherein said first and/or second areas (2, 2*) of one of said groups are displaced separated from said first and/or second areas (3, 3*) of the other one of said groups on said material strip (30).

20. The material strip (30) of claim 16, wherein the width (x) of successive first areas (2) of a first group is about the same as the width (y) of successive second areas (2*) of the same group.

21. The material strip (30) of claim 20, wherein the width (a) of successive first areas (3) of a second group is about the same as the width (b) of successive second areas (3*) of said second group, which widths (a, b) are about twice the widths (x, y) of successive first and second areas (2, 2*) of said first group.

22. The material strip (30) of claim 16, wherein said pattern (1) comprises two groups of first areas (2,3) and second areas (2*, 3*), wherein said areas are selected in number and form effective to provide more than eight (8) binary output signals are created to form said sequence of output pulses.

23. The material strip (30) of claim 16, wherein the edges of first and second areas (2, 2*, 3, 3*) are situated on said strip (30) in such a way with regard to their related detector (8, 9) that when one detector (8, 9) detects an edge the other detector (8, 9) does not detect an edge.

* * * * *